Nov. 20, 1962 R. N. ANDERSON 3,064,535
LEVEL WITH MIRROR
Filed Jan. 13, 1959
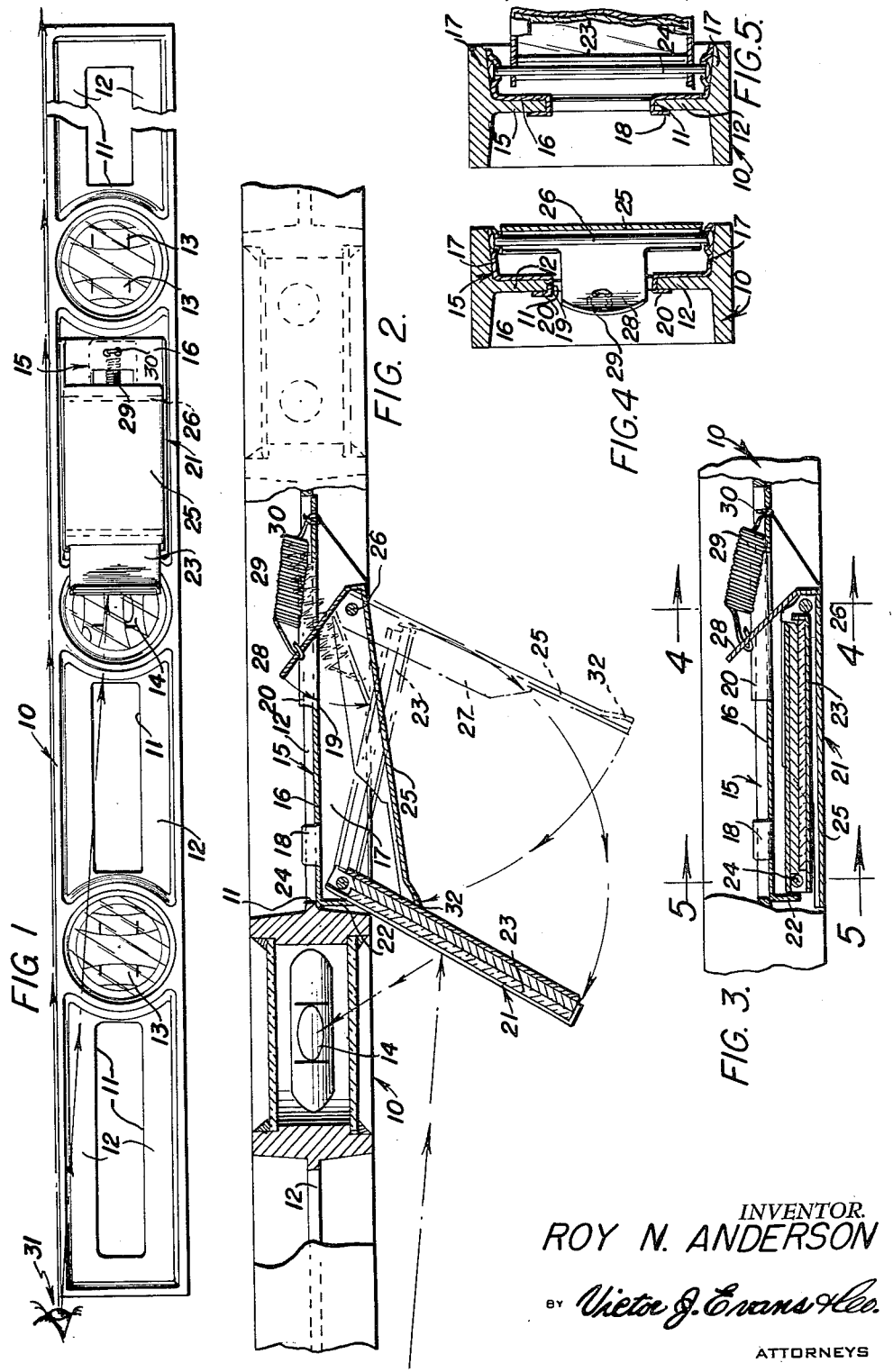
INVENTOR.
ROY N. ANDERSON
BY *Victor J. Evans & Co.*
ATTORNEYS

United States Patent Office 3,064,535
Patented Nov. 20, 1962

3,064,535
LEVEL WITH MIRROR
Roy N. Anderson, Rte. 1, Clovis, N. Mex.
Filed Jan. 13, 1959, Ser. No. 786,544
1 Claim. (Cl. 88—94)

This invention relates to an instrument or tool, and more particularly to a level with a mirror.

The object of this invention or level trans muter is to provide an attachment for any size or type of conventional or ordinary level, new or old, whereby the level can be used as a transit level.

Another object of the invention or level trans muter is to provide a means for converting any or all types conventional or ordinary levels, new or old, into a transit level.

Another object of the invention or level trans muter is to provide an accurate transit level which is extremely simple and inexpensive to manufacture.

Other objects and advantages will be apparent during the course of the following description.

In the accompanying drawings, forming a part of this application, and in which like numerals are used to designate like parts throughout the same.

FIGURE 1 is an elevational view illustrating the transit level of the present invention.

FIGURE 2 is a fragmentary sectional view of the transit level, showing the parts of the level trans muter in the position of FIGURE 1.

FIGURE 3 is a fragmentary sectional view showing the parts of the level trans muter in closed position.

FIGURE 4 is a sectional view taken on the line 4—4 of FIGURE 3.

FIGURE 5 is a sectional view taken on the line 5—5 of FIGURE 3.

Referring in detail to the drawings, the numeral 10 indicates a conventional or ordinary level which is provided with recesses or openings 11 therein, FIGURE 1. Opposed ribs 12 are arranged on opposite sides of the recesses 11, and there is further provided the usual spirit levels 13 and 14. The present invention or level transmuter is an attachment which is indicated generally by the numeral 21, and the attachment 21 serves to convert or transform the level 10 into an instrument capable of being used as a transit level. As shown in the drawings, the attachment 21 includes a frame 15 which is arranged contiguous to one of the recesses 11, and the frame 15 includes a flat base 16. Extending outwardly from the side edges of the base 16 and secured thereto or formed integral therewith are spaced apart flanges 17, FIGURES 4 and 5. The base 16 is also provided with a cut-out that defines a pair of struck-out fingers 18, and these fingers 18 engage certain of the ribs 12 so as to retain the attachment 21 connected to the level 10. As shown in the drawings, there is provided in the base 16 a cut-out 19 which defines a pair of struck-out lugs 20, and the lugs 20 are adapted to also engage the ribs 12 so as to help maintain or retain the device or level trans muter in its proper position connected to the member 10.

Extending outwardly from an end of the base 16 and secured thereto or formed integral therewith is a strop shoulder 22. The numeral 23 indicates a mirror that is pivotally connected to the flanges 17 by means of a pin 24, and the mirror 23 is mounted for movement into and out of engagement with the stop shoulder 22.

There is further provided a plate 25 which is pivotally connected to the flanges 17 of the base 16 by means of a pivot pin 26. This plate 25 is mounted for movement into and out of engagement with the mirror 23. The plate 25 carries a pair of spaced apart side members 27, and when the parts are in the closed position as shown in FIGURE 3, the side members 27 are adapted to abut the base 16. Formed integral with an end of the plate 25 or secured thereto is a tongue 28, and the numeral 29 indicates a coil spring which has one end connected to the tongue 28, the other end of the coil spring 29 being anchored to the base 16 as at 30.

In FIGURE 1 the numeral 31 indicates the eye of a person which is adapted to be arranged as shown in FIGURE 1 when the instrument is being used an a transit level. Thus, it will be seen that with the person's eye 31 in the position of FIGURE 1, and with the mirror 23 held open in the position shown in FIGURES 1 and 2 by means of the plate 25, it will be seen that the person can look into the mirror 23 and observe the spirit level 14 so that the instrument can be readily used as a transit level for any desired purpose.

The spring 29 serves to maintain the plate 25 against the mirror 23 when the parts are in the position shown in FIGURES 1 and 2, so that the mirror 23 will be in proper position to permit the instrument to be used as a transit level. Similarly, when the parts are in the position shown in FIGURE 3, the spring 29 maintains the plate or cover 25 in position over the mirror 23 so that the instrument can be used as an ordinary level in the usual manner. The plate 25 is provided with a finger engaging portion 32 which permits a person's finger to be engaged under the portion 32 so as to facilitate the pivotal movement of the plate 25 on the pin 26.

The parts of the invention or level trans muter can be made of any suitable material and in different shapes or sizes, to fit any and all types and sizes of ordinary or conventional levels.

Thus, it will be seen that there has been provided an attachment or level trans muter, that clamps onto an ordinary level such as a level used by carpenter, bricklayers, construction men, farmers, soil conservation officials and workers, or the like. When the attachment or level trans muter is opened as shown in FIGURES 1 and 2 for example, and in use, it transforms or changes the ordinary level 10 into a transit level which is suitable for setting grade stakes for all types of work such as foundations for buildings or road gradings or for land leveling and terracing in soil conservation work. When the attachment is closed as shown in FIGURES 3, 4 and 5, and not in use, it does not interfere with the ordinary use or original purpose of the level 10. To arrange the device or level trans muter for use, it is only necessary to open the door or plate 25 and then pull the mirror 23 out so that the instrument can be used as a transit level.

The invention or level trans muter may be attached to an ordinary or conventional level that has already been manufactured, of any type or size, new or old; or, it can be installed in a level as original equipment during the original manufacture or fabrication of the level; which attachment or level trans muter will enable the ordinary or conventional level to be used for dual purposes, i.e., as an ordinary level or as a transit level. The attachment or level trans muter can be made so that it is adaptable to different types or sizes of levels.

The present invention or level trans muter is an attachment for converting an ordinary level into a transit level and includes the flat base and flanges which extend outwardly form the side edges of the base, and these flanges provide a means for connecting the base to a level, and the struckout fingers extend from the base and engage ribs.

The present invention or level trans muter provides a means for transforming or converting an ordinary level of conventional construction and including the usual recesses and ribs as well as the spirit levels into a transit level. The invention which is a level trans muter, is an attachment which includes a pivotally mounted mirror 23 as well as a pivotally mounted plate 25. When the instrument is to be used as an ordinary level, the parts are in the closed or folded position, and when in said closed or folded position the level trans muter does not interfere with the ordinary use or original purpose of the level. However, when it is desired to use the instrument as a transit level, the plate 25 is swung open by means of the pivot pin 26 so that the mirror 23 can be moved to the position shown in FIGURE 2 or to the position shown in FIGURE 1, from the position shown in FIGURE 3 and then when pressure is released on the plate 25, the spring will urge or bias the free end of the plate 25 against the mirror so as to retain or hold the mirror in its proper open position. Then, with the person's eye arranged at the position as indicated by the numeral 31, it will be seen that the person can sight along the level so that the image of the spirit level 14 will be reflected by the mirror 23.

The present invention which is a level trans muter, is an attachment for an ordinary or conventional level of any size or shape, new or old, which will transform or convert the ordinary level into an accurate and inexpensive transit level. This level trans muter in addition to being manufactured as an attachment to any conventional or ordinary level, may also be manufactured as a part of the conventional or ordinary level during the original process of manufacturing said level.

In the accompanying drawings, a complete example of a physical embodiment of the present invention has been illustrated, however, it should be understood that this invention or level trans muter is not to be limited to the exact formation or size or type of level which has been used as an illustration in said drawings. It will also be understood that changes and alterations may be made in the mechanical structures, within the scope of the claim, to make the present invention or level trans muter adaptable to the various sizes and types of conventional or ordinary levels, new or old, as an attachment or built in as original equipment during the process of manufacture of said levels, without departing from the principles of the present invention.

It is to be understood that all of the descriptive portion on the mechanical structure, means of operation and purposes of the invention or level trans muter which have been set out in the specification are to be considered as part of the invention and incorporated therein.

Minor changes in shape, size and rearrangement of details coming within the field of invention claimed may be resorted to in actual practice, if desired.

I claim:

In a device of the character described, a body member provided with at least one recess, a spirit level contiguous to said recess, opposed ribs arranged on opposite sides of said recess, a frame arranged contiguous to said recess and said frame embodying a flat base, a pair of spaced apart flanges extending outwardly from the side edges of said base, struckout fingers extending from said base and engaging said ribs, there being a cut-out in said base, struckout lugs contiguous to said cut-out, said lugs engaging said ribs, a stop shoulder arranged on one end of said base, a mirror pivotally connected to said flanges and said mirror being mounted for movement into and out of engagement with said stop shoulder, a plate pivotally connected to said flanges, a pair of spaced apart side members carried by said plate and said side members adapted to selectively abut said base, said plate being mounted for movement into and out of engagement with said mirror, a tongue extending from an end of said plate, and a coil spring having one end connected to said tongue and its other end connected to said base.

References Cited in the file of this patent

UNITED STATES PATENTS

| | | |
|---|---|---|
| 879,122 | Saegmuller | Feb. 11, 1908 |
| 934,698 | Seibert | Sept. 21, 1909 |
| 944,331 | Ingersoll | Dec. 28, 1909 |
| 1,154,873 | Mason | Sept. 28, 1915 |